United States Patent
Metcalfe

[19]
[11] Patent Number: 6,064,761
[45] Date of Patent: *May 16, 2000

[54] NEAR BLACK UNDER COLOR REMOVAL

[75] Inventor: James Robert Metcalfe, Collaroy Plateau, Australia

[73] Assignees: Canon Information Systems Research Australia Pty Limited, New South Wales, Australia; Canon Inc., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/683,648

[22] Filed: Jul. 15, 1996

Related U.S. Application Data

[63] Continuation of application No. 08/204,086, Mar. 2, 1994, abandoned.

[30] Foreign Application Priority Data

Mar. 8, 1993 [AU] Australia .................................. PL7677

[51] Int. Cl.$^7$ ....................................................... G06K 9/00
[52] U.S. Cl. ........................... 382/163; 382/167; 382/266; 358/518; 358/532
[58] Field of Search ..................................... 382/163, 167, 382/266, 268; 358/518, 525, 532

[56] References Cited

U.S. PATENT DOCUMENTS

| | | | |
|---|---|---|---|
| 4,841,361 | 6/1989 | Matsunawa et al. | 358/532 |
| 4,980,760 | 12/1990 | Hiratsuka et al. | 358/532 |
| 5,031,035 | 7/1991 | Abe | 358/532 |
| 5,311,328 | 5/1994 | Murata | 358/518 |
| 5,331,442 | 7/1994 | Sorimachi | 358/532 |
| 5,361,147 | 11/1994 | Katayama et al. | 358/532 |
| 5,475,800 | 12/1995 | Vaughn et al. | 358/518 |

FOREIGN PATENT DOCUMENTS

| | | | |
|---|---|---|---|
| 61-75475 | 4/1986 | Japan | G06F 15/62 |

*Primary Examiner*—Bhavesh Mehta
*Attorney, Agent, or Firm*—Fitzpatrick, Cella, Harper & Scinto

[57] ABSTRACT

An arrangement for sharpening the resolution of printed text in a color printing system is disclosed. An image processing system (1) includes a color conversion apparatus (2) for converting from one color space (RBG) to another color space (CMYK) for display on a color printer (8). The color conversion apparatus (2) includes a near-black correction unit (36) which detects near black-near white and near white-near, black transistions and when such a transition occurs, outputs a full,or deep black color in place of the near-black color.

11 Claims, 5 Drawing Sheets

NEAR BLACK UNDER COLOR REMOVAL

This application is a continuation, of application Ser. No. 08/204,086 filed Mar. 2, 1994, now abandoned.

The present invention relates to the near black under colour removal for the display of colour images on a display device and in particular, the display of colour images by a colour printing device.

BACKGROUND TO THE INVENTION

Images are normally displayed by a CRT type display using an additive format such as in the well known Red, Green, Blue (RGB) format. In this format, separate colour information is provided for each of the Red, Green and Blue primary colours and when displayed together, the colours are mixed to form any desired colour to be displayed.

However, when it is desired to print out a colour representation of the image displayed by a colour printing device, a subtractive colour format is used. One such subtractive format is the Cyan, Magenta, Yellow and Black format (CMYK). Such a subtractive format is commonly used in colour printing device and in particular is used in Canon CLC 500 colour laser printer manufactured by Canon Inc.

A colour conversion apparatus is needed to convert the Red, Green, Blue format into the Cyan, Magenta, Yellow and Black format. However, the conversion of colour from one format to another presents a number of problems. One such problem occurs in the printing of black textual characters on a white background. Because the output of the black character may not be totally made up of only Black toner output, but also portions of Cyan, Magenta and Yellow toners, registration errors can occur on the borders of black to white transitions whereby the relevant toner does not mix properly and the individual colours are evident under close examination.

As the printing of black text on white backgrounds is a common operation with colour printing devices, it is desirable to substantially eliminate the occurrences of this unsightly output.

It is therefore an object of the present invention to substantially overcome, or ameliorate this problem.

SUMMARY OF THE INVENTION

In accordance with one aspect of the present invention there is provided a method of displaying a colour image comprising pixel information and containing black and white edges, the method comprising:

detecting transitions of output pixels between substantially near black and substantially near white, outputting an alternative pixel value for the substantiality near black pixel when each transition occurs.

Preferably the display of colour information is in the form of rasterised data and the transitions are detected in the direction of the rasterised data.

Alternatively transitions are detected in both a horizontal and vertical direction.

In accordance with another aspect of the present invention there is provided Apparatus for displaying a colour image comprising pixel information and containing black and white edges, the apparatus comprising:

near white detection means for detecting input pixels substantially near the value for a white pixel, near black detection means for detecting input pixels substantially near the value for a black pixel, transition detection means connected to a the near white detection means and the near black detection means and adapted to detect transitions from near black to near white and from near white to near black and to output a transition signal upon such a detection, colour correction means adapted to receive transition signal and to alter the output composition of the near black pixel on the occurrence of the transition signal.

BRIEF DESCRIPTION OF THE DRAWINGS

A preferred embodiment of the presentation will now be described with reference to the accompanying drawings in which.

DETAILED DESCRIPTION OF THE PREFERRED EMBODIMENT

Figure 1:
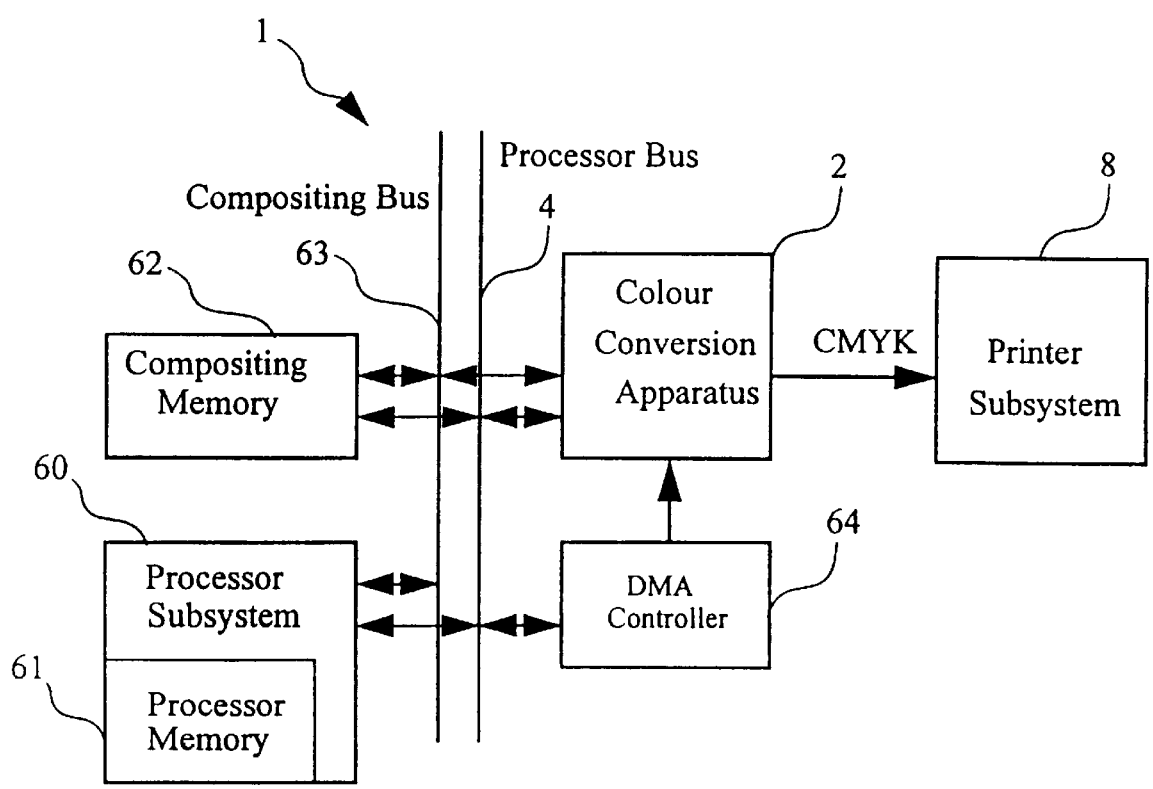
FIG. 1 illustrates a colour processing system that incorporates the preferred embodiment of the present invention.

FIG. 1 shows a colour conversion apparatus 2 designed to form part of a colour image processing system 1 similar to that set out in Australian Patent Application No. 81782/91 of Aug. 16, 1991 (Attorney Ref: (Page+2)(186264)). However, applications of the present embodiment however are not limited thereto. The colour image processing system 1 is used in a typical application, and configured to operate on a standard computer system. The colour conversion apparatus 2 interacts with two main subsystems:

The first is a processor subsystem 60, which includes, in particular, a processor memory 61. Colour conversion tables required for each colour pass are established in the processor memory 61. The colour image processing system 1 loads the colour conversion table required for each colour pass (C, M, Y or K) at the beginning of a conversion pass. These can be loaded either via normal write cycles to the processor memory 61 or under control of a DMA master controller 64. Adjunct to the processor subsystem 60 is a compositing memory 62 and a corresponding compositing bus 63.

The second is a printer subsystem 8. The C,M,Y or K value resulting from interpolating the colour conversion table by the colour conversion apparatus 2 will be output to the printer subsystem 8 by the colour conversion apparatus 2.

Processor input/output (I/O) to and from the colour conversion apparatus 2 is performed by processor bus interface subsystem 3 via a processor bus 4 in synchronization with the processor clock. I/O to and from the printer subsystem 8 is synchronized with the pixel clock of the relevant printer subsystem. An example printer subsystem 8 for use with the preferred embodiment of the present invention is Canon's CLC500 colour printer.

Figure 2:
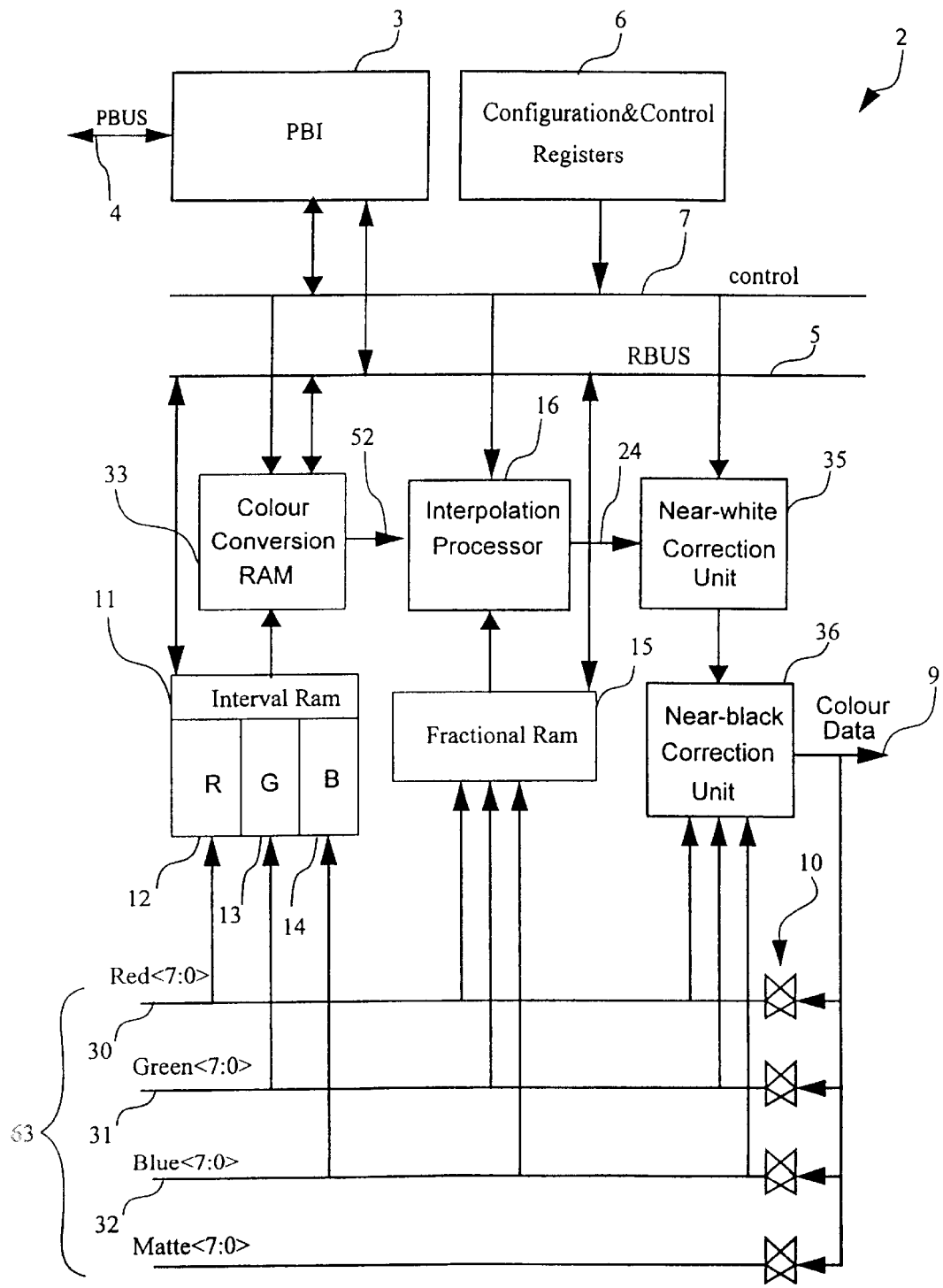
FIG. 2 illustrates a colour conversion apparatus used in the system of FIG. 1 that incorporates the preferred embodiment of the present invention.
Figure 3:
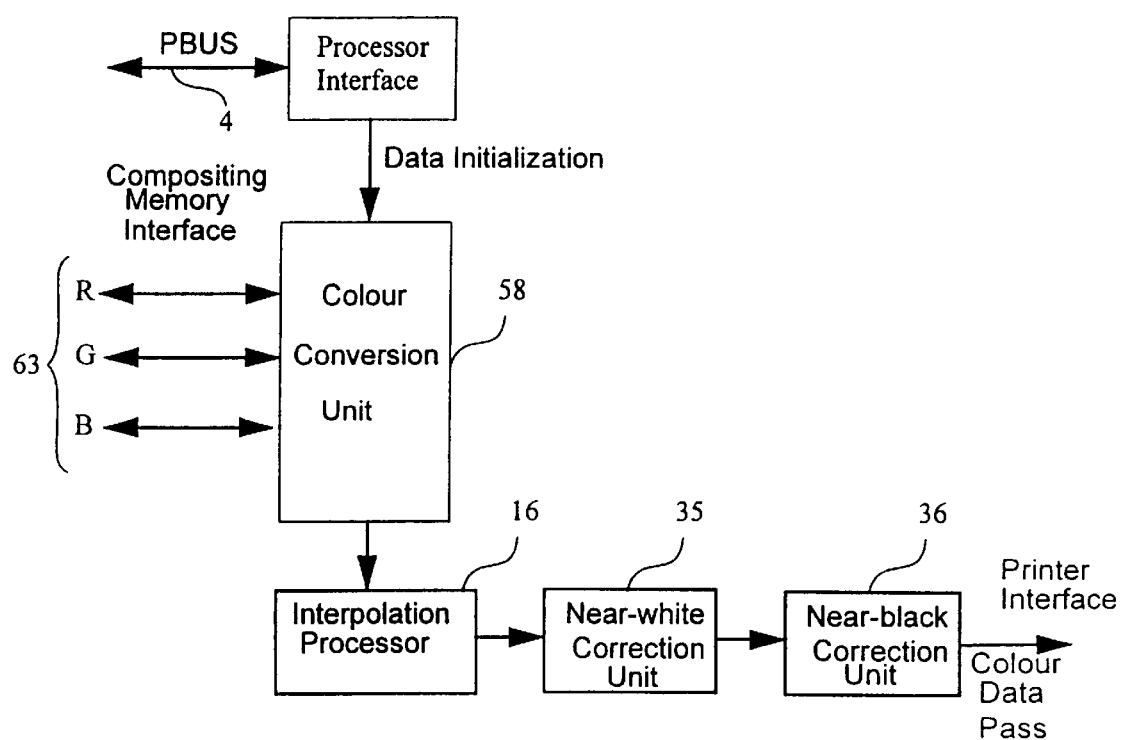
FIG. 3 illustrates the execution pipeline of the colour conversion apparatus of FIG. 2.

FIG. 2 shows schematically the structure of the colour conversion apparatus 2, the data flow of which is shown in FIG. 3.The modules in colour conversion apparatus 2 form a processing pipeline which accept a stream of RGB pixel data from the compositing bus 63 and pass it along the processing pipeline to generate the appropriate colour conversion data for output to the printer interface.

The interface of the colour conversion apparatus 2 to the processor bus 4 is controlled by the processor bus interface subsystem 3. The processor bus interface subsystem 3 interfaces the processor bus 4 to an internal register bus 5 for register read and write cycles, and processor DMA accesses to internal RAM within the colour conversion apparatus 2.

Configuration and control of colour conversion apparatus 2 is achieved by reading and writing internal configuration and control registers 6 of the colour conversion apparatus 2 which generates control information 7 from those registers for the colour conversion apparatus 2.

Each of the internal memories are dual ported (not necessarily physically but functionally by means of the processor mode bit in the configuration and control registers 6), with a port assigned to the execution pipeline of the colour conversion apparatus 2 and a port assigned to the register bus 5. The port assigned to the register bus 5 is used for the loading of each internal memory before each colour pass of the printer subsystem 8.

Three distinct operations are performed by colour conversion apparatus 2, those being colour conversion, near-white correction performed by a near white correction unit 35, and text detect edge enhancement performed by a near black correction unit 36. The resulting output data 9 is the RGB to CMYK colour conversion required by the relevant printing device.

The output data 9 can be returned back to the compositing memory 62 by an arrangement of bi-directional buffers 10.

Referring now to FIG. 3, there is shown the execution pipeline of the colour image processing system 1, in which three distinct operations are performed therein. Colour conversion is performed by a colour conversion unit 58 and interpolation processor 16, near white processing is performed by near white processing unit 5 and near black processing is performed by the near black processing unit 6.

The colour conversion unit 58 represents a combination of a colour conversion RAM 33 and a non-uniform colour space conversion interval RAM 11, and together with the interpolation processor 16 which perform the colour conversion from the RGB format to the CMYK format. The near white correction unit 35 then performs near white colour correction on the output so as to extend the dynamic range of an output device such as a printer when printing colours near white. The output is then passed through the near black correction unit 36 before being passed to the printer interface for printing.

The near black correction unit 36 acts to sharpen up the edges of text by detecting the transition from black to white or vice versa. When an edge is detected, instead of printing a black made up of, for example, the Cyan, Magenta, Yellow and Black that it would normally comprise, a substantial portion of a single black colour is printed. This has the effect of hiding colour registration errors and removing excess toner around fine black text.

The single colour black is actually a four colour black but with a substantial amount of "under colour removal" (UCR). When a black edge is detected the output is limited to printing a register value within the near black correction unit 36. This register is loaded with a value representing 100% output for the black pass, and say 20% for the other passes. Hence there will be 80% UCR which has been found to produce better results than 100% UCR which tends to produce results that appear too 'thin' when fine lines of text are printed.

Figure 4:
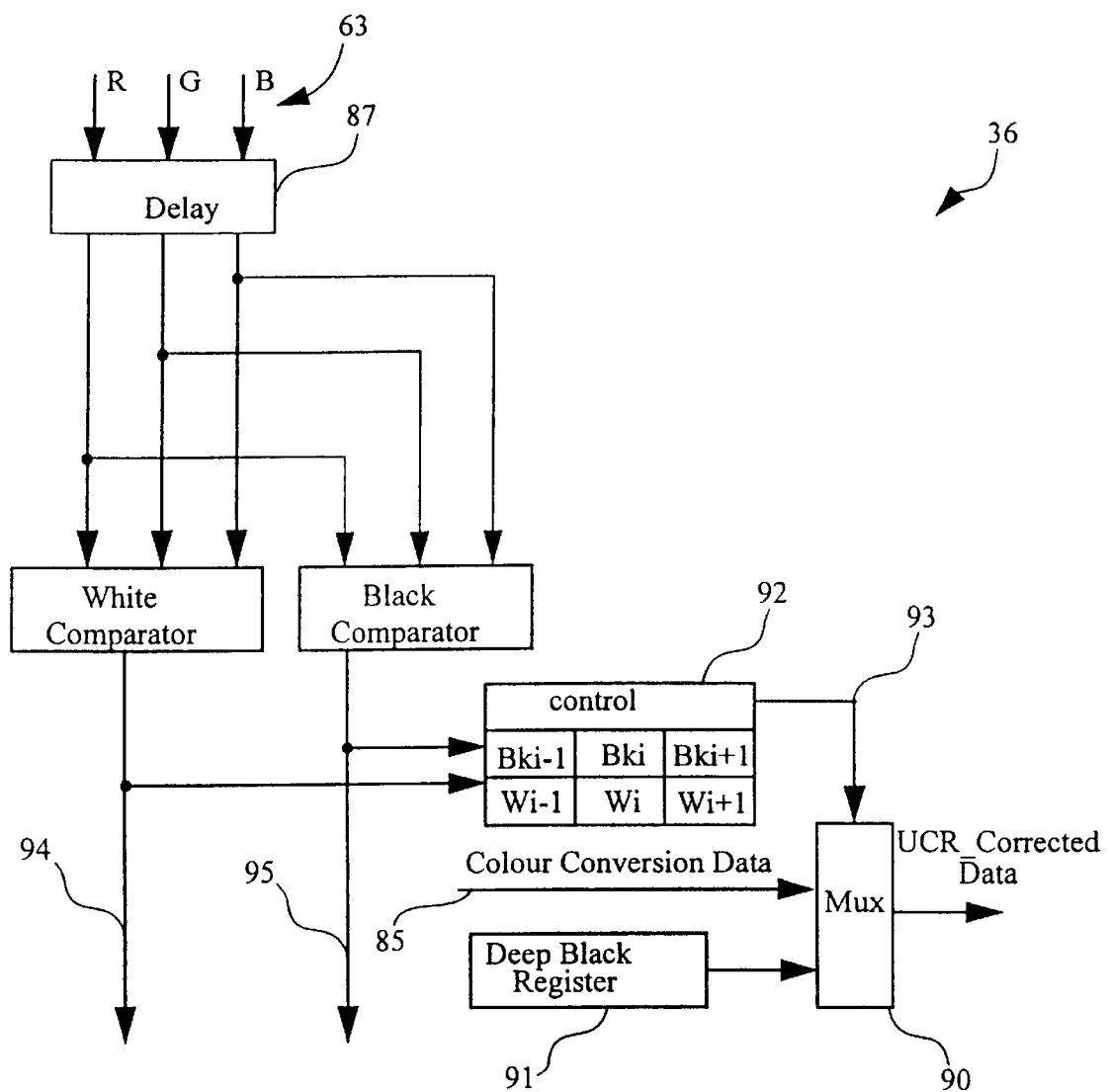
FIG. 4 illustrates the near black processor unit of FIG. 2.

Referring now to FIG. 4, there is shown the structure of the near black correction unit 36. The RGB input pixels 88 from the compositing bus 63 are input to a latch and delay unit 87, to be delayed so they are synchronized with colour conversion data obtained from the near white output 85 previously derived from the interpolation processor 16. The near black correction unit 36 detects the case of a black input pixel. If the input pixel is not black then a multiplexor 90 passes the colour conversion data of the near white output 85 (i.e. from the previous pipeline stage) unchanged from its input to its output.

If the current input pixel is black, a near black control unit 92 tests the pixel's immediate neighbours for whiteness. If either of the neighbours are white then the near black control unit 92 considers that it has detected an edge and activates the multiplexor 90 via multiplexor control signal 93 which then selects the contents of a deep black register 91 rather than the near white output 85.

In order to provide some tolerance to noise in the input signal white values are considered to be in the range of R,G,B values being 0xFF–0xFE and black values are set in the range 0x00–0x01. This allows for least significant bit errors during compositing operations prior to colour conversion.

The near black correction unit 36 processor scans a line for the case of a black to white or white to black transition. This enables the detection of horizontal edges. If a system requires the detection of vertical edges then it will be necessary to scan from line to line. Two status signals, a white detect signal 94 and a black detect signal 95 are provided for use for the optional detection of edges in a vertical scanning direction.

Figure 5:
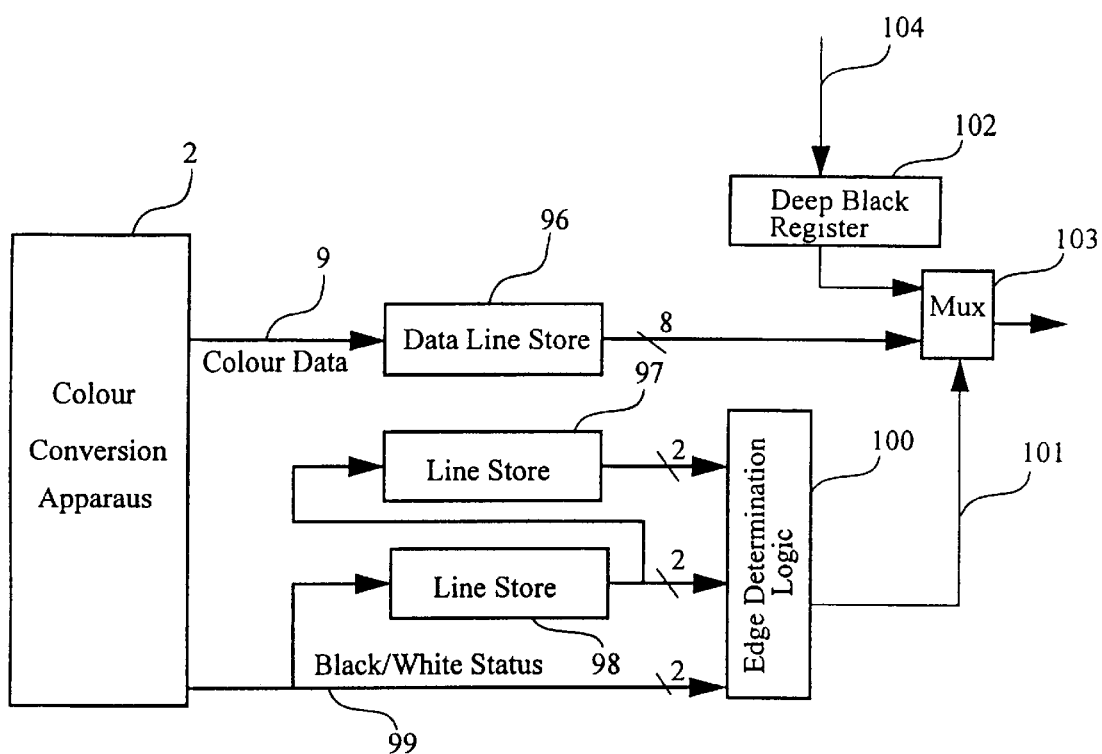
FIG. 5 illustrates the adaption of the colour conversion apparatus to detect vertical edges.

Referring now to FIG. 5, there is shown an embodiment of a vertical edge detection system, which is ancillary to the colour conversion apparatus 2. One line of colour conversion data comprising the output data 9 is stored in a data line store 96, being the line that is to be colour corrected for text edges. A first line of status information is stored in a first status information store 97, and a second line of status information is stored in a second status information store 98, the second status information store 98 corresponding to the line being written to the data line store 96, and the store 97 to the line previously in the data line store 96. The third line of status information is current status information 99 and comes directly from the colour conversion apparatus 2 (see FIG. 4).

An edge determination logic unit 100 performs the same function as that performed in the near black correction unit 36 in that an edge determination logic unit output signal 101 is high when the output of the second status information store 98 indicates a black pixel, and either the output of the first status information store 97 or the current status information 99 indicates a white pixel. When such a condition occurs a multiplexor 103 outputs the value stored in another deep black register 102 otherwise the colour data from the data line store 96 is output. The deep black register 102 is reloaded via an RBUS input 104, derived from the register bus 5, at each colour data pass of the printer device.

The forgoing describes only one embodiment of the present invention and modifications, obvious to those skilled in the are can be made thereto without departing from the scope of the present invention.

What I claim is:

1. A method of reproducing display data of a color image on a recording medium by a printing device, said image comprising a plurality of pixels at least some of which represent black and white edges of said image, the method compensating for at least one deficiency in reproduction characteristics of the printing device and comprising the steps of:

receiving said display data comprising the pixels;

detecting transitions of the pixels between substantially near black and substantially near white, thereby to detect edges within the image;

storing data of an alternative pixel value for the substantially near black pixel, the alternative pixel value having a greater black component than the substantially near black pixel; and outputting to the printing device, when each transition occurs, the stored alternative pixel value for the substantially near black pixel.

2. A method as claimed in claim 1 wherein said pixels are displayed as rasterised data and the transitions are detected in a direction of rasterization.

3. A method as claimed in claim 1 wherein the transitions are detected in both horizontal and vertical directions.

4. A method as claimed in claim 1 wherein said alternative pixel value is that of a wholly black pixel.

5. A method as claimed in claim 1 wherein said alternative pixel value is an 80% black pixel.

6. Apparatus for reproduction of display data of a color image on a recording medium by a printing device, the image comprising a plurality of pixels at least some of which represent black and white edges of the image, the apparatus comprising:

means for receiving the display data including the pixels;

near white detection means for detecting those ones of the pixels substantially near a value for a white pixel;

near black detection means for detecting those ones of the pixels substantially near a value for a black pixel;

transition detection means connected to said near white detection means and said near black detection means and adapted to detect transitions from near black to near white and from near white to near black and to output a transition signal upon such a detection;

color correction means adapted to receive the transition signal to increase the black component of a near black pixel on the occurrence of the transition signal to alter the output composition of the near black pixel; and storing means for storing data of the altered near black pixel, wherein said color correction means outputs the stored data of the altered near black pixel to the printing device in accordance with the transition signal, to thereby compensate for at least one deficiency of reproduction of the printing device.

7. Apparatus as claimed in claim 6 wherein said pixels are displayed as rasterised data and the transitions are detected in a direction of rasterization.

8. Apparatus as claimed in claim 6 wherein the transitions are detected in both horizontal and vertical directions.

9. Apparatus as claimed in claim 6 wherein the output composition of the near black pixel is altered to that of a wholly black pixel.

10. Apparatus as claimed in claim 6 wherein said alternative pixel value is a 80% black pixel.

11. Apparatus as claimed in claim 6, further comprising image forming means for forming an image in accordance with the output from said colour correction means.

* * * * *

UNITED STATES PATENT AND TRADEMARK OFFICE
CERTIFICATE OF CORRECTION

PATENT NO. : 6,064,761

DATED : May 16, 2000

INVENTOR(S) : JAMES ROBERT METCALFE

Page 1 of 2

It is certified that error appears in the above-identified patent and that said Letters Patent is hereby corrected as shown below:

ON THE TITLE PAGE [57] ABSTRACT:

Line 9, "full,or" should read --full, or--.

COLUMN 1:

Line 22, "device" should read --devices--;
    Line 51, "substantiality" should read --substantially--; and
    Line 59, "Apparatus" should read --apparatus--.

COLUMN 2:

Line 62, "accept" should read --accepts--.

COLUMN 4:

Line 58, "are" should read --area--.

COLUMN 5:

Line 13, "rasterised" should read --rasterized--.

UNITED STATES PATENT AND TRADEMARK OFFICE
CERTIFICATE OF CORRECTION

PATENT NO.   :   6,064,761
DATED        :   May 16, 2000
INVENTOR(S)  :   JAMES ROBERT METCALFE

It is certified that error appears in the above-identified patent and that said Letters Patent is hereby corrected as shown below:

<u>COLUMN 6</u>:

Line 18, "rasterised" should read --rasterized--;
    Line 26, "a" should read --an--; and
    Line 29, "colour" should read --color--.

Signed and Sealed this

Twenty-second Day of May, 2001

Attest:

NICHOLAS P. GODICI

Attesting Officer     Acting Director of the United States Patent and Trademark Office